INVENTORS.
STANLEY J. SAVINESE
GILBERT B. GERHART
BY Samuel Kane
ATTORNEY

April 15, 1969 S. J. SAVINESE ET AL 3,439,218

CONTROL CIRCUIT FOR CAUSING MOVEMENT OF A CATHODE RAY TUBE DISPLAY

Filed Sept. 30, 1966 Sheet 2 of 2

INVENTORS.
STANLEY J. SAVINESE
GILBERT B. GERHART

BY Samuel Kane
ATTORNEY

United States Patent Office 3,439,218

Patented Apr. 15, 1969

3,439,218

CONTROL CIRCUIT FOR CAUSING MOVEMENT OF A CATHODE RAY TUBE DISPLAY

Stanley J. Savinese, Ridley Park, and Gilbert B. Gerhart, Plymouth Meeting, Pa., assignors to Burroughs Corporation, Detroit, Mich., a corporation of Michigan Filed Sept. 30, 1966, Ser. No. 583,319

Int. Cl. H01j *29/70;* H03k *4/02*

U.S. Cl. 315—18 9 Claims

ABSTRACT OF THE DISCLOSURE

A control circuit for moving an otherwise stationary display on a cathode ray tube. A capacitor is charged periodically to generate increments of voltage each corresponding to a display frame. Each increment of voltage is used to effect a stepwise deflection of the cathode beam so as to cause the stationary display to move.

This invention relates generally to cathode ray tube display systems and more particularly to a control circuit for causing a display to move across the cathode ray tube screen.

Occasionally, a long series of characters is required to be displayed on a cathode ray tube screen, but because the length of the series exceeds the capacity of the particular cathode ray tube the entire display cannot be presented at the same time. One example of such a series of characters is a long message whose number of lines of information exceeds the built-in line capacity of the particular cathode ray tube.

Accordingly, it is one of the objects of this invention to provide a control circuit for cathode ray tube display systems which permits the display of a long series of characters, such as a long message, for example, which otherwise would be beyond the capacity of the particular cathoode ray tube.

Another object of the invention is to provide a control circuit for cathode ray tube display systems which causes a scroll-like movement or roll of a message or a line of characters which is being displayed on the screen of a cathode ray tube.

Another object of the invention is to provide such a control circuit for cathode ray tube display systems which can be adjusted to vary the rate of movement of the display.

A further object of the invention is to provide a control circuit for cathode ray tube display systems which permits such systems to display either stationary or moving messages.

In accordance with the above objects and considered first in one of its broader aspects, the invention is designated to be used in a display system having means for displaying successive frames of lines of characters on the screen of a cathode ray tube. The invention causes the display to move across the screen from a start position of the display toward a terminal position of the display. For this purpose, the invention utilizes means for generating an increment of voltage at the end of each display frame of a predetermined number of display frames to generate a staircase voltage waveform, and provides additional means for coupling this waveform to the deflection circuit of the cathode ray tube to cause stepwise deflection of the cathode beam to effect the display movement. The invention provides further means which are responsive to a predetermined value of the staircase voltage waveform for signalling the display system to have it remove a line of characters from the terminal position of the display and to display a new line of characters at the start position of the display and for causing another of the staircase voltage waveforms to be generated.

The invention will be more clearly understood when the following detailed description of the preferred embodiment thereof is read in conjunction with the accompanying drawings in which.

Figure 1:
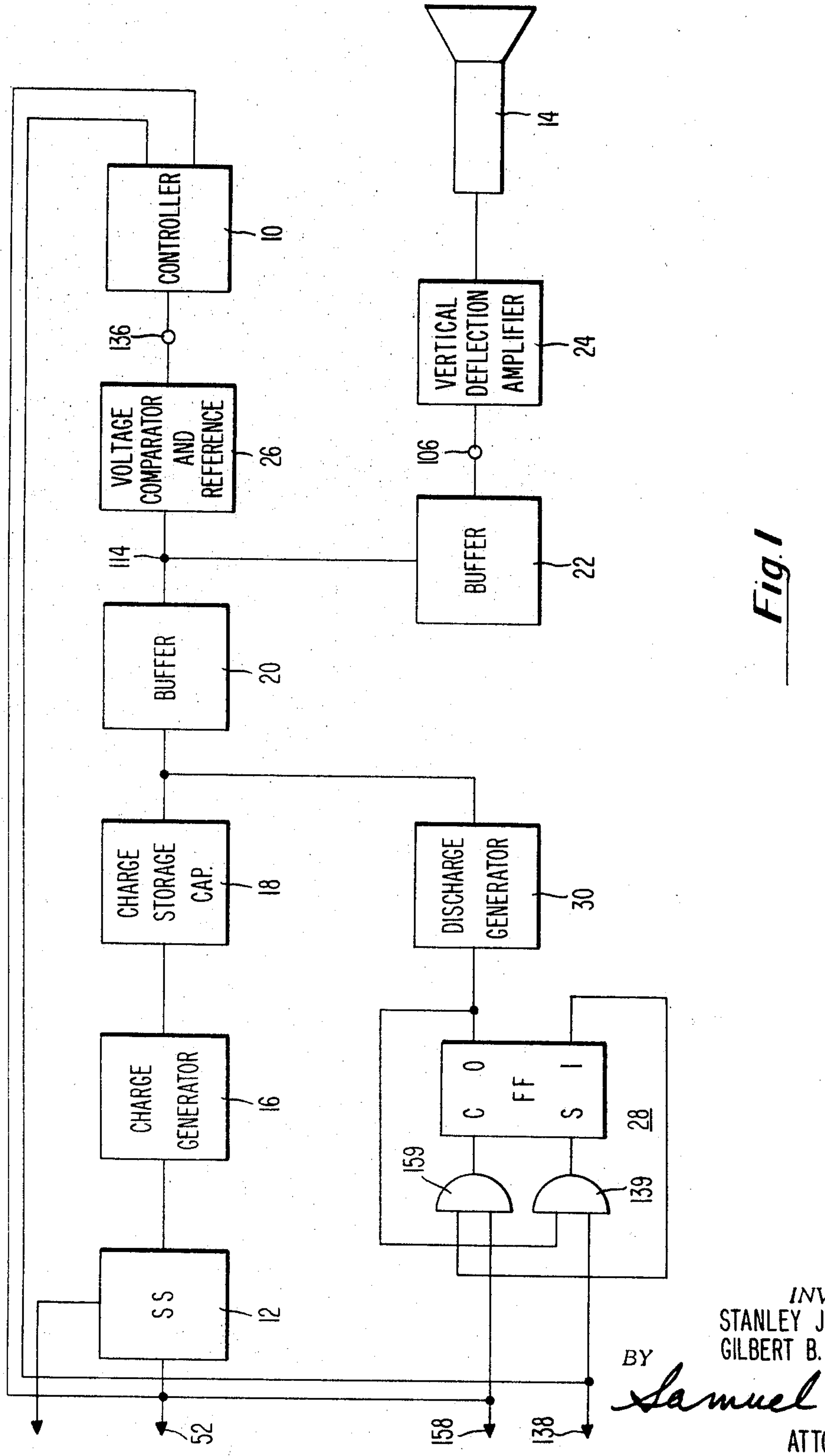
FIG. 1 is a block diagram of a control circuit according to the invention.

The control circuit of the present invention is used in a cathode ray tube display system having means for displaying successive frames of lines of characters on the screen of the cathode ray tube. In one particular display system in which the present invention was used, a frame of display consisted in scanning the screen once from left to right and from top to bottom, as viewed. However, different types of display frames may be utilized with the present invention, if desired.

Thus in the particular display system mentioned, a controller 10 (FIG. 1), which may be part of the logic circuitry of the particular display system, serves to provide trigger pulses at the frame rate to a pulse generator 12, which in the present embodiment of the invention is constructed in the form of a single-shot multivibrator. Each trigger pulse from the controller 10 is applied to the single-shot 12 after each display frame so that the control circuit of this invention operates between frames during the time when the beam of the cathode ray tube 14 is blanked.

The triggered single-shot 12 provides an output pulse, preferably of variable width, which is applied to turn on a charge generator 16 for applying a linear step of charge to a charge storage capacitor 18. The voltage thus generated across the capacitor 18 is coupled through high input impedance buffers 20 and 22 to a vertical deflection amplifier 24 which is connected to the vertical yoke portion of the deflection system of the cathode ray tube 14. Thus, the cathode ray tube beam is deflected an increment vertically during each display frame to cause the display to appear to move upwardly a corresponding amount. While the present embodiment of the invention is described with reference to vertical movement of a display, it is understood that horizontal movement as well as angular or other movement of the display between vertical and horizontal movement are also within the scope of this invention.

The output of the capacitor 18 is also coupled through the buffer 20 to a voltage comparator and reference circuit 26. The voltage comparator and reference circuit 26 is sensitive to the output of the capacitor 18 so that when the voltage across the capacitor 18 reaches a predetermined value beyond the value of a reference voltage established by the circuit 26, after a number of display frames corresponding to a one-line displacement of the display, the circuit 26 will provide a digital output to the controller 10, which in effect notifies the display system circuitry that a one-line displacement of the display has taken effect, and that the control circuit of the invention should be reset in preparation for the next one-line displacement. Through means forming no part of the present invention, the controller 10 will signal the associated display system to have it remove a line of characters from the terminal position of the display on the cathode ray tube 14, and to display a new line of characters at the start position of the display. The controller 10 will also cause the control circuit of the invention to reset by first triggering a binary device 28 for turning on a discharge genertor 30 to discharge the capacitor 18. The binary circuit 28 may take various forms, however, in the present embodiment it is in the form of a bistable multivibrator, commonly known as a flip-flop.

After the capacitor 18 has been discharged and before the commencement of the next display frame, the controller 10 will trigger the single-shot 12 to begin a new one-line display cycle. At this time also, the controller 10 will trigger the flip-flop 28 to turn off the discharge generator 30 to complete resetting, thereby placing the capacitor 18 in a chargeable condition for the next one-line display cycle.

Figure 2:
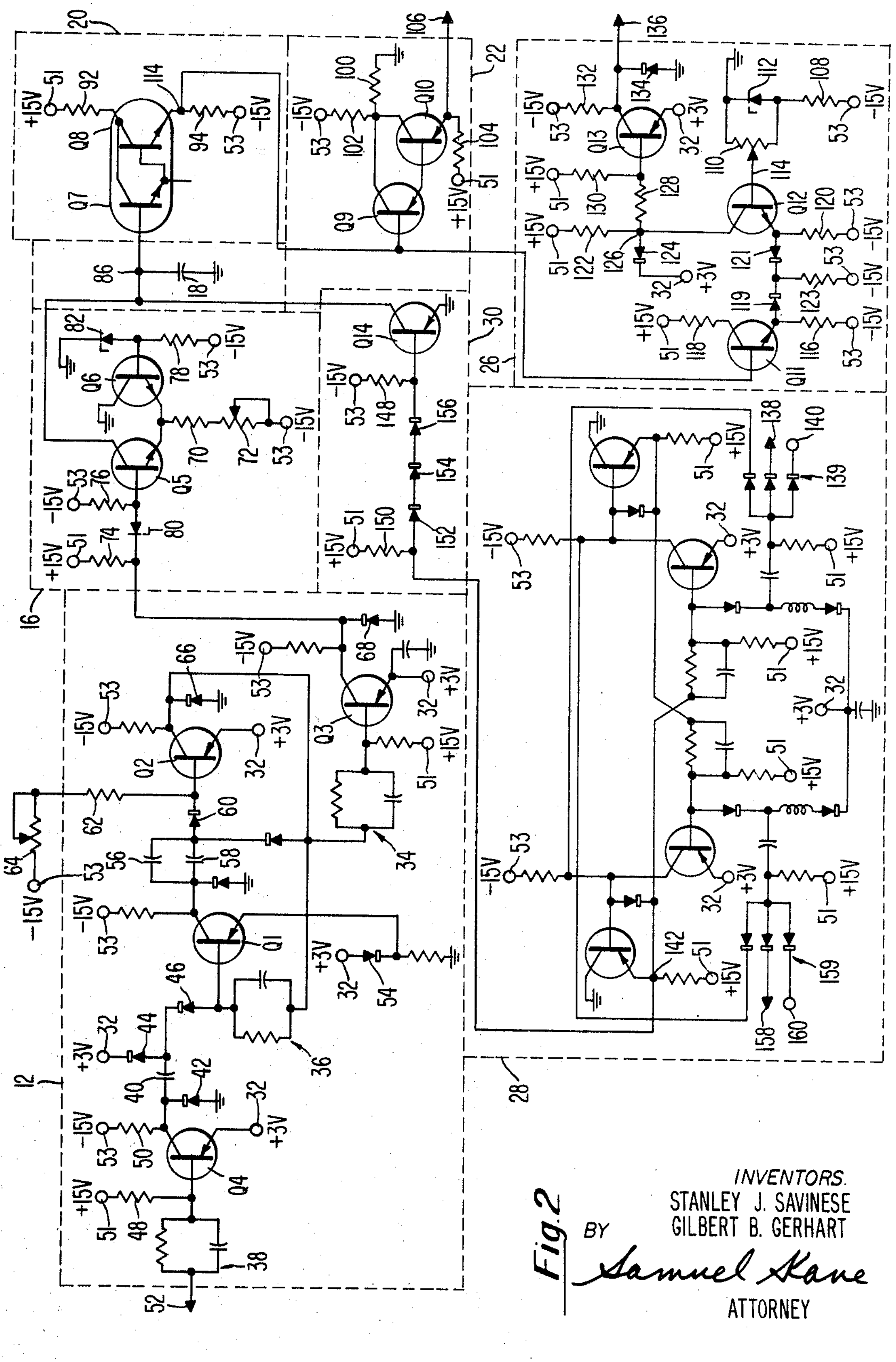
FIG. 2 is a schematic diagram showing the detailed circuits of most of the components of FIG. 1.

As shown in the schematic circuit diagram in FIG. 2, the single-shot circuit 12 comprises transistors Q1 and Q2 connected as a monostable multivibrator. When the single-shot circuit 12 is in its stable state, forward bias is applied to he base of transistor Q2 so that transistor Q2 is conducting and clamps its collector to a +3 volt level of a source of positive potential 32. The potential at the collector of transistor Q2 is coupled to the base of an output stage transistor Q3 through an RC circuit 34, holding transistor Q3 cut off in the stable state. The collector potential of transistor Q2 is also coupled to the base of transistor Q1 through an RC circuit 36, also to hold transistor Q1 cut off in the stable state. The single-shot circuit 12 is triggered by a triggering pulse applied to the base of transistor Q1 through a triggering circuit comprising an RC circuit 38, a transistor Q4, a capacitor 40, diodes 42, 44 and 46, and resistors 48 and 50 which are returned to positive and negative sources of potential 51 and 53, respectively. In the stable state, transistor Q4 is conducting and clamps its collector to the +3 volt potential of the source 32.

A positive trigger pulse is applied to terminal 52 of the single-shot trigger circuit by the controller 10 causing transistor Q4 to cut off and invert the input signal at its collector, which clamps to ground through the diode 42, so that a negative trigger pulse is applied through the capacitor 40 and diode 46 to the base of transistor Q1. Transistor Q1 turns on and clamps its collector to the +3 volt potential of source 32 through diode 54. The positive voltage now on the collector of transistor Q1 adds to the positive charge already across capacitors 56 and 58 whose total charge is now applied to the base of transistor Q2 for holding transistor Q2 cut off. Capacitors 56 and 58 discharge through a diode 60, a resistor 62 and a variable resistor 64, connected to the negative source 53, until the base of transistor Q2 is again forward biased. The RC time constant of capacitors 56 and 58 and resistors 62 and 64 determines the time delay and pulse width of the output pulse of the single-shot circuit 12. When transistor Q2 first cuts off, its collector will be clamped to ground or 0 volts by a diode 66. Through the RC circuit 34, the 0 volt level at the collector of transistor Q2 will be coupled to the base of transistor Q3 turning this transistor on. The collector of transistor Q3, which was held to 0 volts or ground level by a diode 68, will clamp to the +3 volt level of the source 32 to form the leading edge of the output pulse. When capacitors 56 and 58 discharge to the point where transistor Q2 is again forward biased, the output level at the collector of transistor Q3 will swing back to the 0 volt level, thus completing the output pulse so that the single-shot circuit 12 will again be in its stable state. As will appear more clearly hereinafter, by varying the resistance of the resistor 64 the rate of movement of the display may be varied.

The output pulse of the single-shot circuit 12 at the collector of transistor Q3 is coupled to the charge generator 16. The charge generator 16 is made up of transistors Q5 and Q6, a resistor 70 and a variable resistor 72, both of which are connected to the emitters of transistors Q5 and Q6. Resistor 72 is returned at its other end to the negative source of potential 53. Transistors Q5 and Q6, together with resistors 70 and 72, make up a constant current switch. Also included in the charge generator circuit 16 are resistors 74 and 76 which connect, respectively, to the positive and negative sources 51 and 53, a resistor 78, and Zener diodes 80 and 82. The Zener diode 80 is connected at one end to resistor 76 and the base of transistor Q5 and at its other end to resistor 74. The Zener diode 82 and resistor 78 are connected between the source of negative potential 53 and ground level so that the Zener diode 82 effectively places a constant voltage bias on the base of transistor Q6.

Before the trigger pulse is applied to the input terminal 52, the cathode of the Zener diode 80 is clamped to ground or 0 volts by the diode 68 and the Zener diode 80 couples this level in the negative direction so that the base electrode of transistor Q5 is at a lower voltage than the base electrode of transistor Q6. Therefore, transistor Q6 is at that time turned on, with a constant current flowing in its emitter-collector circuit, while transistor Q5 is cut off. When the output level at the collector of Q3 moves in the positive direction as the result of a triggering pulse applied to terminal 52, the base of transistor Q5 will become more positive than the base of transistor Q6, causing transistor Q6 to cut off, and transistor Q5 to turn on. A constant current will now flow in the emitter-collector circuit of transistor Q5 which will commence charging the capacitor 18 linearly. By varying the resistance of the resistor 72, the amount of current flowing in the collector-emitter circuit of transistor Q5 may be varied to thereby vary the increment or amount of voltage placed on the capacitor 18. As will appear more clearly hereinafter, this method of adjustment will also serve to vary the rate of movement of the display.

The output terminal 86 of the capacitor 18 is connected to the base of a transistor Q7 which forms part of the high input impedance buffer 20. The buffer 20 includes the transistor Q7 and a transistor Q8, both connected internally in a Darlington configuration. Transistors Q7 and Q8 have their collectors interconnected and connected to one end of a resistor 92 which has its other end returned to the positive source of potential 51. The emitter of transistor Q8 is connected to one end of a resistor 94 which has its other end connected to the negative source of potential 53. The emitter electrode of transistor Q8 is connected to the base electrode of a transistor Q9 which is included in the high input impedance buffer 22.

The high input impedance buffer 22 includes the transistor Q9 and a transistor Q10 which are also connected in a Darlington configuration. Transistors Q9 and Q10 have their collectors interconnected and connected to one end of resistors 100 and 102, the other ends of which are connected, respectively, to ground and to the negative source of potential 53. The emitter of transistor Q10 is coupled to a resistor 104 which is returned to the positive source of potential 51. The emitter of transistor Q10 is connected to the output terminal 106 for the buffer 22 which is coupled to the vertical deflection amplifier 24, as shown in FIG. 1. Through the emitter-follower action of the buffers 20 and 22, the voltage at the output terminal 86 of the capacitor 18 is coupled to the deflection amplifier 24.

The emitter electrode of transistor Q8 which is the output terminal 114 of buffer 20 is coupled to the voltage comparator and reference circuit 26. The circuit 26 consists of three parts: a voltage reference circuit, a two-transistor switch and an output stage for converting the outputs of the circuit to digital or logic levels. In the present embodiment of the invention these levels are 0 volt and +3 volts, as indicated previously.

The voltage reference of circuit 26 includes resistors 108 and 110 which are interconnected at one end, and with the other end of resistor 108 connected to the negative source 53 and the other end of resistor 110 returned to ground level. Also part of the reference circuit is a Zener diode 112 which has its cathode returned to ground level, and its anode connected to the junction of resistors 108 and 110.

The two-transistor switch in circuit 26, which is the voltage comparator portion, includes transistors Q11 and Q12. The base of transistor Q11 is connected to the base of transistor Q9 in the buffer circuit 22 and also to the emitter of transistor Q8 which is the output terminal 114 of buffer 20. The emitter of transistor Q11 is connected to one end of a resistor 116 whose other end is coupled to the negative source of potential 53, and the collector of transistor Q11 is connected to a resistor 118 which is returned to the positive source of potential 51. Transistor Q12 has its base connected to the potentiometer arm 114 of the reference circuit, and its emitter connected to one end of a resistor 120 whose other end is coupled to the negative source of potential 53. Two oppositely poled interconnected diodes 119 and 121 are connected between the emitters of transistors Q11 and Q12 and have their junction connected to one end of a resistor 123 whose other end is returned to the negative source of potential 53. The collector of transistor Q12 is coupled to the positive source of potential 51 through a resistor 122. The junction of resistor 122 and the collector of transistor Q12 is connected to the anode of a diode 124 whose cathode is returned to the positive source 32. This constitutes the two-transistor switch portion of the circuit 26.

The output stage of the circuit 26 includes a transistor Q13 whose base is connected to the junction of two resistors 128 and 130, which are connected respectively to the junction 126 and the positive source of potential 51. The collector of transistor Q13 is connected to one end of a resistor 132 whose other end is coupled to the negative source of potential 53, and to the cathode of a diode 134 whose anode is returned to ground level. The junction of the diode 134 and the collector of transistor Q13 is the output terminal 136 which connects the voltage comparator and reference circuit 26 to the controller 10, as shown in FIG. 1.

During the time that the capacitor 18 is being charged by the application of successive trigger pulses to the input terminal 52 by the controller 10, the state of the voltage comparator and reference circuit 26 is such that transistor Q13 is cut off and has its collector clamped to 0 volt or ground by diode 134, and with transistors Q11 and Q12 turned on. At this time also, the voltage on the base of transistor Q12 is more negative than the voltage on the base of transistor Q11 so that diode 121 is reverse biased and diode 119 is forward biased.

As the negative staircase voltage builds up on the capacitor 18, the voltage on the capacitor will reach a level such that the voltage on the base of the transistor Q11 will become more negative than the voltage on the base of transistor Q12. This will cause the diode 119 to be reverse biased and the diode 121 to be forward biased. Increased current will now flow in the emitter-collector circuit of transistor Q12. This increase in current will result in a negative-going signal at the junction 126 which through the resistor 128 will turn transistor Q13 on. Transistor Q13 will saturate and clamp its collector to the +3 volt level of the positive source 32. The resulting digital signal to the controller 10 signifies that a one-line displacement of the display has taken place. The controller 10 will then signal the display system, by means not shown and forming no part of the present invention, to have the display system remove a line of characters from the top, or terminal, position of the cathode ray tube screen, and to display a new line of characters at the bottom, or start, position of the cathode ray tube screen. The controller 10 will also reset the control circuit of the invention by causing the capacitor 18 to be discharged and then conditioned to be recharged, and will commence to again apply triggering pulses to the terminal 52, in the usual manner after successive display frames, to continue movement of the display, as described heretofore.

Resetting of the control circuit by the controller 10 is initiated by a positive-going signal applied to an input terminal 138 of an AND gate 139 of the flip-flop 28 which coincides in time with a positive clock pulse applied to an input terminal 140 of the AND gate 139 to cause the flip-flop 28 to change states and cause its output terminal 142 to swing from +3 volts to 0 volt. This change in level is applied to the discharge generator 30 which includes a transistor Q14 having its base connected to one end of a resistor 148 whose other end is returned to the negative source of potential 53, a resistor 150 connected at one end to the positive source of potential 51, and similarly poled series connected diodes 152, 154 and 156 connected between the other end of the resistor 150 and the base of transistor Q14.

Prior to the change in voltage level at terminal 142, the +3 volt level at that terminal is coupled in the negative direction to the base of transistor Q14 by the diodes 152, 154 and 156 but not sufficiently negative to turn transistor Q14 on, so that transistor Q14 remains off during charging of the capacitor 18. However, when resetting is initiated, as described above, and the level of the terminal 142 moves in the negative direction to the 0 volt level transistor Q14 turns on and effectively applies a short circuit to ground across the capacitor 18, thus to discharge the capacitor. Following the discharge of the capacitor 18, the controller 10 applies a positive trigger pulse to the terminal 52 to initiate charging of the capacitor 18. At the same time, the controller 10 applies this positive pulse to an input terminal 158 of the AND gate 159 of the flip-flop 28 which coincides in time with a clock pulse applied to an input terminal 160 of the AND gate 159 to cause the flip-flop 28 to revert to its original state so that terminal 142 swings back to the positive level to cut off transistor Q14 and thereby permit capacitor 18 to be charged, as described previously.

The operation of the control circuit may be given again briefly and summarized as follows.

After each display frame, the controller 10 applies a trigger pulse to the input terminal 52 of the single-shot circuit 12. This results in a positive-going signal at the collector of transistor Q3. The width of this signal may be varied by varying the resistance of the resistor 64, to thereby vary the rate of movement of the display.

The positive signal from the collector of transistor Q3 cuts off transistor Q6 and turns on transistor Q5 which then generates a constant current in its emitter-collector circuit to apply a linear voltage step to the capacitor 18. The output of the capacitor is coupled to the deflection system of the cathode ray tube 14 through the buffers 20 and 22 and the deflection amplifier 24 to cause the display to be moved through an increment of distance, in this case vertically, corresponding to the step of voltage on the capacitor 18.

When the negative staircase voltage on the capacitor 18 reaches a level such that the voltage on the base of transistor Q11 is less positive than the voltage on the base of transistor Q12, a negative-going signal will appear at junction 126 and turn the transistor Q13 on to cause its collector electrode to swing from 0 volt level to +3 volt level. This digital output at terminal 136 is applied through the controller 10 to the flip-flop 28 to cause it to change states and turn on the transistor Q14 to discharge the capacitor 18. After the capacitor is discharged, the flip-flop 28 is again triggered to cut off the discharge transistor Q14 and trigger pulses are again applied to the terminal 52 to resume movement of the display.

The control circuit of the present invention may be kept inactive for stationary displays, however, part of it may be used to prevent voltage excursions from disturbing the stationary display. This is accomplished by setting the terminal 142 of the flip-flop 28 at its 0 volt level. This will keep transistor Q14 turned on and capacitor 18 discharged, so that no changes in voltage can appear across capacitor 18 which might otherwise tend to disturb the presentation of the stationary display.

It is understood that the specific logic levels, biasing voltages, polarities and particular types of transistors discussed and illustrated are not limiting, but were used merely for purposes of explanation.

While there has been shown and described a specific control circuit to exemplify the principles of the invention, it is to be understood that this circuit is but one embodiment of the invention and that the invention is capable of being constructed in a variety of circuit configurations without departing from the true scope and spirit thereof. Accordingly, the invention is not to be limited by the specific control circuit described, but only by the subjoined claims.

What is claimed is:

1. In a display system having means for displaying successive frames of lines of characters as a stationary display on the screen of a cathode ray tube, a control circuit for causing the stationary display to move across said screen from a start position of the display toward a terminal position of the display comprising means for generating an increment of voltage at the end of each display frame of a predetermined number of display frames to generate a staircase voltage waveform, means for coupling said staircase voltage waveform to the deflection circuit of said cathode ray tube to cause stepwise deflection of the cathode beam to effect said display movement, and means responsive to a predetermined value of said staircase voltage waveform for signalling said display system to have it remove a line of characters from said terminal position of the display and to display a new line of characters at said start position of the display and for causing another of said staircase voltage waveforms to be generated.

2. In a display system having means for displaying successive frames of lines of characters as a stationary display on the screen of a cathode ray tube, a control circuit for causing the stationary display to move across said screen from a start position of the display toward a terminal position of the display comprising a capacitor, a pulse generator actuated after each display frame for providing an output pulse, charging means responsive to a number of said output pulses for charging said capacitor in steps to generate a staircase voltage waveform across said capacitor, means for coupling said staircase voltage waveform to the deflection system of said cathode ray tube to cause stepwise deflection of the cathode beam to effect said display movement, digital means responsive at the end of a display frame to an increase in said staircase voltage waveform beyond a reference voltage for providing a digital output pulse, and control circuitry for actuating said pulse generator and responsive to said digital output pulse for initiating the discharge of said capacitor.

3. A control circuit according to claim 2 wherein said charging means is a constant current generator which charges said capacitor in linear staircase voltage steps at least most of which are identical in duration and voltage value.

4. In a display system having means for displaying successive frames of lines of characters on the screen of a cathode ray tube, a control circuit for causing the display to move across said screen from a start position of the display toward a terminal position of the display comprising a capacitor, a pulse generator actuated after each display frame for providing an output pulse, charging means responsive to a number of said output pulses for charging said capacitor in steps to generate a staircase voltage waveform across said capacitor, means for coupling said staircase voltage waveform to the deflection system of said cathode ray tube to cause stepwise deflection of the cathode beam to effect said display movement, digital means responsive at the end of a display frame to an increase in said staircase voltage waveform beyond a reference voltage for providing a digital output pulse, control circuitry for actuating said pulse generator and responsive to said digital output pulse for initiating the discharge of said capacitor, and means actuated by said control circuitry in response to said digital output pulse for discharging said capacitor.

5. A control circuit according to claim 4 wherein said discharging means comprises a current generator for discharging said capacitor, and a bistable circuit effective in one of its stable states for turning said current generator off and switchable to its other stable state by said control circuitry in response to said digital output pulse for turning said current generator on.

6. In a display system having means for displaying successive frames of lines of characters on the screen of a cathode ray tube, a control circuit for causing the display to move across said screen from a start position of the display toward a terminal position of the display comprising a capacitor, a pulse generator actuated after each display frame for providing an output pulse, charging means responsive to a number of said output pulses for charging said capacitor in steps to generate a staircase voltage waveform across said capacitor, means for coupling said staircase voltage waveform to the deflection system of said cathode ray tube to cause stepwise deflection of the cathode beam to effect said display movement, digital means responsive at the end of a display frame to an increase in said staircase voltage waveform beyond a reference voltage for providing a digital output pulse, control circuitry for actuating said pulse generator and responsive to said digital output pulse for initiating the discharge of said capacitor, and means for varying the pulse width of said pulse generator output pulses whereby the rate of movement of said display may be varied.

7. In a display system having means for displaying successive frames of lines of characters on the screen of a cathode ray tube, a control circuit for causing the display to move across said screen from a start position of the display toward a terminal position of the display comprising a capacitor, a monostable multivibrator actuated after each display frame for providing an output pulse, charging means responsive to a number of said output pulses for charging said capacitor in steps to generate a staircase voltage waveform across said capacitor, means for coupling said staircase voltage waveform to the deflection system of said cathode ray tube to cause stepwise deflection of the cathode beam to effect said display movement, digital means responsive at the end of a display frame to an increase in said staircase voltage waveform beyond a reference voltage for providing a digital output pulse, and control circuitry for actuating said monostable multivibrator and responsive to said digital output pulse for initiating the discharge of said capacitor.

8. In a display system having means for displaying successive frames of lines of characters on the screen of a cathode ray tube, a control circuit for causing the display to move across said screen from a start position of the display toward a terminal position of the display comprising a capacitor, a pulse generator actuated after each display frame for providing an output pulse, charging means responsive to a number of said output pulses for charging said capacitor in steps to generate a staircase voltage waveform across said capacitor, means for coupling said staircase voltage waveform to the deflection system of said cathode ray tube to cause stepwise deflection of the cathode beam to effect said display movement, digital means responsive at the end of a display frame to an increase in said staircase voltage waveform beyond a reference voltage for providing a digital output pulse, and control circuitry for actuating said pulse generator and responsive to said digital output pulse for initiating the discharge of said capacitor, and wherein said digital means comprises reference means for establishing a constant reference voltage, a comparator circuit coupled to the output of said capacitor and to said reference means for providing a signal when the output of said capacitor increases beyond said reference voltage, and a switching circuit operable to provide two digital output levels and connected to receive said signal for switching from one digital output level to the other.

9. In a display system having means for displaying successive frames of lines of characters on the screen of a cathode ray tube, a control circuit for causing the display to move across said screen from a start position of the display toward a terminal position of the display comprising a capacitor, a pulse generator actuated after each display frame for providing an output pulse, a constant current generator responsive to a number of said output pulses for charging said capacitor in linear steps at least most of which are identical in duration and voltage value to generate a staircase voltage waveform across said capacitor, means for coupling said staircase voltage waveform to the deflection system of said cathode ray tube to cause stepwise deflection of the cathode beam to effect said display movement, digital means responsive at the end of a display frame to an increase in said staircase voltage waveform beyond a reference voltage for providing a digital output pulse, control circuitry for actuating said pulse generator and responsive to said digital output pulse for initiating the discharge of said capacitor, and means for varying the current generated by said constant current generator whereby the rate of movement of said display may be varied.

References Cited

UNITED STATES PATENTS

| | | | |
|---|---|---|---|
| 2,753,552 | 7/1956 | Hom. | |
| 3,082,294 | 3/1963 | Dean | 178—6.8 |
| 3,153,699 | 10/1964 | Plass | 178—6.8 |
| 3,299,205 | 1/1967 | Stavis. | |

RODNEY D. BENNETT, Jr., *Primary Examiner.*

B. L. RIBANDO, *Assistant Examiner.*

U.S. Cl. X.R.

178—6.8